March 11, 1930.  B. NOYES, JR  1,750,422

THERMOMETER

Filed July 7, 1928

INVENTOR:
BY Bradford Noyes, Jr.
Alfred Burger
ATTORNEY

Patented Mar. 11, 1930

1,750,422

UNITED STATES PATENT OFFICE

BRADFORD NOYES, JR., OF ROCHESTER, NEW YORK, ASSIGNOR TO TAYLOR INSTRUMENT COMPANIES, OF ROCHESTER, NEW YORK, A CORPORATION OF NEW YORK

THERMOMETER

Application filed July 7, 1928. Serial No. 290,999.

This invention relates to thermometers, especially to thermometers used in connection with industrial processes.

As is well known, it is often very difficult to read thermometers, especially at some distance, due often to a film of deposit formed on the stem or to unfavorable light conditions. Mercury, in particular, has the disadvantage that, because of its reflective surface, its opacity does not bring about the desired contrast relatively to the glass stem and the light effects caused thereby due to the reflective and refractive action thereof.

Illumination of the thermometer, as a rule, does not increase the contrast, since the light rays, being reflected from both the mercury column and the bore above the top of the mercury column and also, in part from other parts of the stem, tend to obliterate the contrast between the mercury and the stem containing it rather than augment it.

The present invention has for its object an arrangement for increasing the visual contrast between the mercury and the stem containing it.

For a full understanding of the invention and the principle of operation on which it is based, reference is made to the accompanying drawings, wherein.

Figure 3:
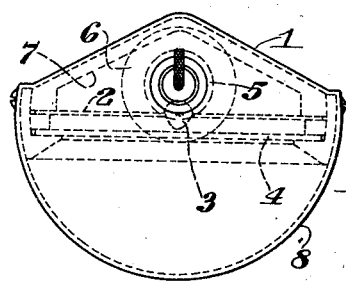
Fig. 3 is a plan view thereof.
Figure 1:
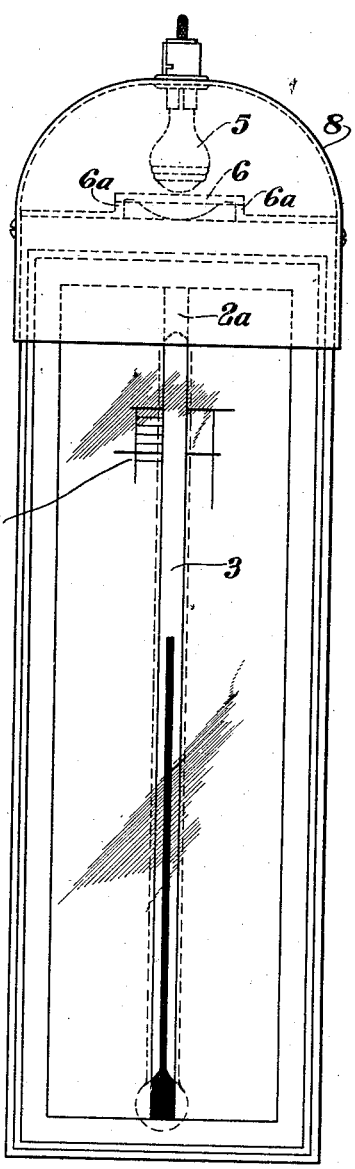
Fig. 1 is a front elevation showing an embodiment of the invention.
Figure 2:
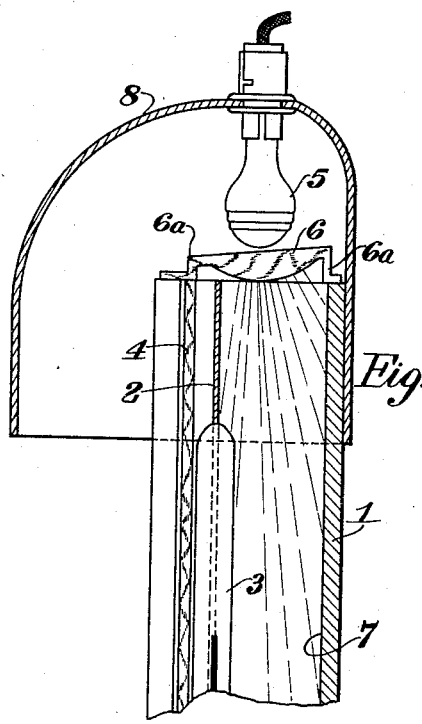
Fig. 2 is a fragmentary sectional view thereof on an enlarged scale, taken at right angle to Fig. 1.

The thermometer assembly shown, including the V-shaped back 1, the scale plate 2 having a central slot 2ª and the thermometer stem 3 disposed in the slot 2ª and the glass plate 4 disposed in front of the scale plate 2 and protecting the same, represents an old and usual form of industrial thermometer construction.

My invention includes primarily a source of light, preferably an electric light bulb 5, a lens 6 disposed above the upper end of the stem 3 and symmetrically to the back 1 and the scale plate 3, and a preferably white light diffusing surface on the inner side of the V-shaped back 1.

The significance of the arrangement is as follows:

The light rays emanating from the bulb 5 are collected by the lens 6 and directed principally against the diffusing surface 7 from which the light is uniformly distributed over the area surface of the stem 3 and transmitted through the body of the stem to the eye of an observer in front of the thermometer. Since light rays are emitted from each point of the diffusing surface 7, the light effect, within certain limits, does not depend upon the position of the observer. The stem 3 appears as a white surface, while the mercury column due to the opacity of mercury appears as a dark streak.

All the light reaching the observer's eye being light transmitted from the diffusing surface 7 at the rear of the stem 3, and no light being reflected to the observer from the front face of the mercury column or from the glass stem and its bore, the visual contrast is a maximum.

The lens 6, which is preferably slightly tilted toward the back 1, is of such power and so disposed as to cause a substantially uniform illumination of the diffusing surface 7. According to the law of physics that the intensity of light decreases with the square of the distance from the light source, the illumination would normally decrease toward the bottom of the surface 7. However, the concentration of the rays toward the center of the lens and also, to some extent, the tilting of the lens effect an increase in the amount of light shifted toward the bottom of the surface 7 to offset the decrease of the density.

I preferably employ a hood 8 whereby a small fraction of the light may be directed to the front surface of the scale plate 2 to illuminate the scale. However, it is obvious that substantially no part of the light reflected from the hood 8 downwardly upon the stem 3 can reach the eye of the observer since rays reflected from the stem or the mercury, following the laws of reflection, are directed downwardly away from the observer in front.

The lens 6 may be cast integrally with a supporting frame 6ª.

It is understood that the electric bulb may be associated with switch mechanism for turning on the light only when an observation is to be made.

So far as the operation is concerned, the light bulb might be disposed at the bottom. In fact the location of the source of light relatively to the light diffusing member is immaterial, provided it effects a substantially uniform illumination of the latter. It is understood that the light diffusing member may be opaque and operate by reflection or it may be translucent and may operate by transmission, as the well known glass ground screen. While I have specifically referred to an opaque light-diffusing member, principally because I took advantage of a well known form of thermometer assembly, the light-diffusing member and its positional relation to the light source, on the one hand, and the thermometer stem, on the other hand, may be changed within relatively wide limits.

The lens represents one optical means for making the density of the light substantially uniform at the surface of the diffusing member. There are other means for accomplishing the same purpose. It is, moreover, understood that the light density may vary at different parts of the diffusing member, provided it is substantially uniform over an area in longitudinal alignment with the stem or symmetrically disposed relatively to the stem along the length thereof.

The hood 8 is preferably a reflector, but the front part thereof may be made, at least in part, diffusing to obtain the desired light effect upon the scale.

I claim:

1. In a thermometer assembly, the combination of a thermometer stem, of a light diffusing member disposed in back of the stem in a position to illuminate the latter and means for substantially uniformly illuminating the light diffusing member, including a light source located near one end of the member and optical means for directing the light from the light source upon the diffusing member so as to make the density of the light at the surface of said member substantially uniform over an area in longitudinal alignment with the stem.

2. In a thermometer assembly, the combination of a thermometer stem, of a light diffusing member disposed in back of the stem in a position to illuminate the latter and means for substantially uniformly illuminating the light diffusing member, including a light source located near one end of the member and optical means for directing the light from the light source upon the diffusing member so as to make the density of the light substantially uniform over the entire area of the said member.

3. In a thermometer assembly, the combination of a thermometer stem, a scale plate having a slot for receiving the stem, a light diffusing member in back of the stem in a position to illuminate the same, means for illuminating the light diffusing member, including a source of light near one end of the stem, optical means between the source and the said member for rendering the density of the light at the surface of the member substantially uniform over an area in longitudinal alignment with the stem, and a hood surrounding the light source, said hood being constructed to direct a fraction of the light downwardly over the scale plate.

4. In a thermometer assembly, the combination with the thermometer stem, of a light-diffusing member disposed behind the stem substantially parallel thereto, a source of light and means between the source of light and the light-diffusing member for substantially uniformly distributing the light from the source upon the light-diffusing member.

5. In a thermometer assembly, the combination with the thermometer stem, of an opaque member having a light-diffusing surface disposed substantially parallel to the stem and directed toward it, a source of light disposed at one end of the said member and means for substantially uniformly distributing the light from the source over the diffusing surface.

In testimony whereof I affix my signature.

BRADFORD NOYES, Jr.